No. 879,064. PATENTED FEB. 11, 1908.
A. PROHASKA.
SHEARS OR SCISSORS.
APPLICATION FILED SEPT. 20, 1907.
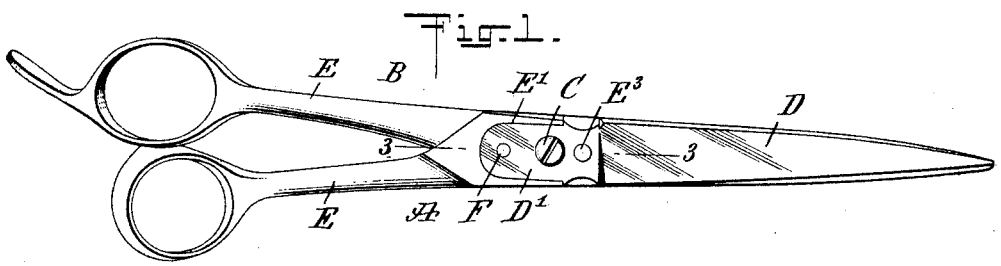
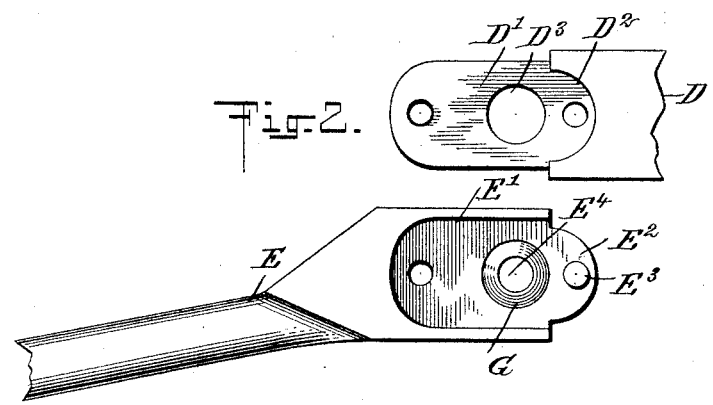
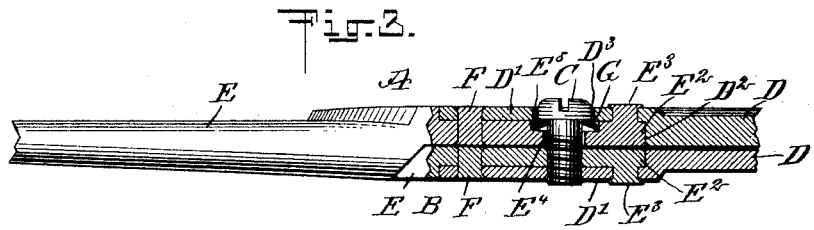
WITNESSES
INVENTOR
Antony Prohaska
BY
ATTORNEYS

UNITED STATES PATENT OFFICE.

ANTONY PROHASKA, OF PHILADELPHIA, PENNSYLVANIA.

SHEARS OR SCISSORS.

No. 879,064.  Specification of Letters Patent.  Patented Feb. 11, 1908.

Application filed September 20, 1907. Serial No. 393,811.

*To all whom it may concern:*

Be it known that I, ANTONY PROHASKA, a subject of the Emperor of Austria-Hungary, and a resident of Philadelphia, in the county of Philadelphia and State of Pennsylvania, have invented a new and Improved Shears or Scissors, of which the following is a full, clear, and exact description.

The object of the invention is to provide a new and improved shears or scissors having blades of steel and handles of cast iron, brass or of other metal than steel and arranged to hold the cutting edges of the blades in proper cutting contact with each other.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement; Fig. 2 is an enlarged face view showing the interlocking blade and handle portions disconnected, and Fig. 3 is an enlarged longitudinal sectional elevation of the improvement on the line 3—3 of Fig. 1.

The members A and B of the shears or scissors are connected with each other by a pivot C, each of the members A and B consisting of a cutting blade D of steel and a handle E of metal other than steel such as cast iron, brass, bronze or the like. The blade D and the handle E are rigidly interlocked with each other, the pivot C passing through both interlocked portions, as plainly indicated in Fig. 3.

In order to interlock the blade D and the handle E, the handle E is provided at the pivot end with a recess E' into which fits the correspondingly shaped shank D' of the blade D, the recessed portion of the handle E terminating in a tongue $E^2$ fitting into a recess $D^2$ formed in the blade D at the inner face thereof adjacent to the shank D'. The tongue $E^2$ is provided with an integral rivet $E^3$ passing through an aperture in the blade D, to rivet the latter to the handle E, and another rivet F is passed through the handle E and the shank D' near the terminal of the latter, to connect the blade D to the handle E. In addition to the fastening means described, the handle E and the blade D are preferably welded together at the interlocked portions or parts referred to.

In order to insure proper contact at all times of the cutting edges of the blades D of both members A and B, a spring G is used, on which bears the head of the pivot C, which latter is preferably in the form of a screw screwing in the member B at both the shank D' and the recessed portion of the handle E (see Fig. 3). The spring G is in the form of a dished ring interposed between the recessed portion of the handle E for the member A and the shank D' of the blade D for the member A. For this purpose the recessed portion of the handle E for the member A is provided with an opening $E^4$ for the passage of the shank of the pivot C. This aperture $E^4$ leads to an enlarged recess $E^5$ in which the spring G is seated, to be engaged by the underside of the head of the pivot C extending into an opening $D^3$ formed in the shank D' and somewhat less in diameter than the recess $E^4$. Now by interposing the spring G between the head of the pivot C secured in the member B and the member A, it is evident that yielding connection is had between the two members, the spring tending to hold the cutting edges of the blades D of the members A and B at all times in proper cutting contact with each other.

It will be noticed that by the arrangement described, the spring G is firmly held at all times in position between the interlocked ends of the blade D and the handle E of the member A and hence the spring G cannot drop out and be lost when unscrewing the pivot C and taking the members A and B apart for grinding or other purposes.

Having thus described my invention, I claim as new and desire to secure by Letters Patent:

1. Shears or scissors comprising blades and handles for the same, each handle having a recess and a projecting tongue, and each blade having a shank and a recess, in which fits the said handle tongue, the said blade shank fitting the said handle recess to interlock the blade and handle, and means for fastening the interlocked parts together.

2. Shears or scissors comprising blades and handles for the same, each handle having a recess and a projecting tongue, and each blade having a shank and a recess in which fits the said handle tongue, the said blade shank fitting the said handle recess to interlock the blade and handle, and a rivet connecting the said tongue with the said blade.

3. Shears or scissors comprising blades and handles for the same, each handle having a recess and a projecting tongue, and each blade having a shank and a recess in which fits the said handle tongue, the said blade shank fitting the said handle recess to interlock the blade and handle, and a rivet connecting the said tongue with the said blade and forming an integral part of the said tongue.

4. Shears or scissors comprising blades and handles for the same, each handle having a recess and a projecting tongue, and each blade having a shank and a recess in which fits the said handle tongue, the said blade shank fitting the said handle recess to interlock the blade and handle, a rivet connecting the said tongue with the said blade, and a rivet connecting the said blade shank with the said handle.

5. Shears or scissors having a blade, a handle permanently interlocked with the said blade, and a spring between the interlocked parts.

6. Shears or scissors having a pair of cutting blades, handles interlocked with the blades, a spring interposed between one of the cutting blades and its interlocked handle, and a screw screwing in the other cutting blade and having its head engaging the said spring.

7. Shears or scissors having a cutting blade, a handle, the said blade and handle having registering apertures for the pivot of the shears or scissors, means for fastening the said blade and the said handle together, and a spring interposed between the said blade and the said handle, the spring being in the form of a dished ring concentric with the said pivot apertures.

8. Shears or scissors comprising blades and handles for the same, each handle having a recess and a projecting tongue, and each blade having a shank and a recess in which fits the said handle tongue, the said blade shank fitting the said handle recess to interlock the blade and handle, the said interlocked parts being riveted and welded together.

In testimony whereof I have signed my name to this specification in the presence of two subscribing witnesses.

ANTONY PROHASKA.

Witnesses:
 WM. D. NEES,
 CHARLES J. PROHASKA.